United States Patent
Preuss et al.

(10) Patent No.: US 8,165,171 B2
(45) Date of Patent: Apr. 24, 2012

(54) METHODS AND SYSTEMS FOR DISTRIBUTED SYNCHRONIZATION

(75) Inventors: Robert David Preuss, Arlington, MA (US); Thomas Patrick Bidigare, Arlington, VA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 2 days.

(21) Appl. No.: 12/383,192

(22) Filed: Mar. 19, 2009

(65) Prior Publication Data
US 2010/0238956 A1    Sep. 23, 2010

(51) Int. Cl.
    *H04J 3/06* (2006.01)
(52) U.S. Cl. .......................... 370/503; 375/354
(58) Field of Classification Search .......... 370/200–253, 370/343–344, 353–356, 503–545; 455/560; 375/354–376
    See application file for complete search history.

(56) References Cited

U.S. PATENT DOCUMENTS

| | | | |
|---|---|---|---|
| 4,868,522 A | 9/1989 | Popat et al. | |
| 5,038,341 A | 8/1991 | Berman et al. | |
| 7,349,512 B2 | 3/2008 | Rausch et al. | |
| 7,453,910 B1 | 11/2008 | Biberstein et al. | |
| 2003/0164794 A1* | 9/2003 | Haynes et al. | 342/353 |
| 2005/0201421 A1 | 9/2005 | Bhandari et al. | |
| 2008/0137482 A1 | 6/2008 | Kang et al. | |
| 2008/0240321 A1 | 10/2008 | Narus et al. | |
| 2008/0311957 A1* | 12/2008 | Jantunen et al. | 455/560 |
| 2010/0103917 A1* | 4/2010 | Brown et al. | 370/343 |

OTHER PUBLICATIONS

D. Richard Brown, IEEE vol. 56. No. 11, Nov. 2008.*
R. Mudumbai , IEEE vol. 6, No. 5, May 2007.*
Brown, D. Richard and Poor, H. Vincent. "Time-slotted round-trip carrier synchronization for distributed beamforming," IEEE Transactions on Signal Processing, vol. 56, No. 11, Nov. 2008.
Mudumbai, R., Barriac, G., Madhow, U. "On the feasibility of distributed beamforming in wireless networks," IEEE Transactions on Wireless Communications, vol. 6, No. 5, May 2007.

* cited by examiner

*Primary Examiner* — Pao Sinkantarakorn
*Assistant Examiner* — Iqbal Zaidi
(74) *Attorney, Agent, or Firm* — Ropes & Gray LLP

(57) ABSTRACT

The invention provides a set of methods and systems for obtaining a synchronized signal in a distributed fashion. The methods and systems described herein allow a node to obtain a periodic signal that would be synchronized with the periodic signal obtained at another node when both nodes follow the same synchronizing procedure, without the need for centralized control of both nodes or the need for all nodes to have coordinated local oscillators. The invention includes beamforming methods and systems for producing a coherent beam at a target location and at a target frequency using the synchronized signal.

41 Claims, 13 Drawing Sheets

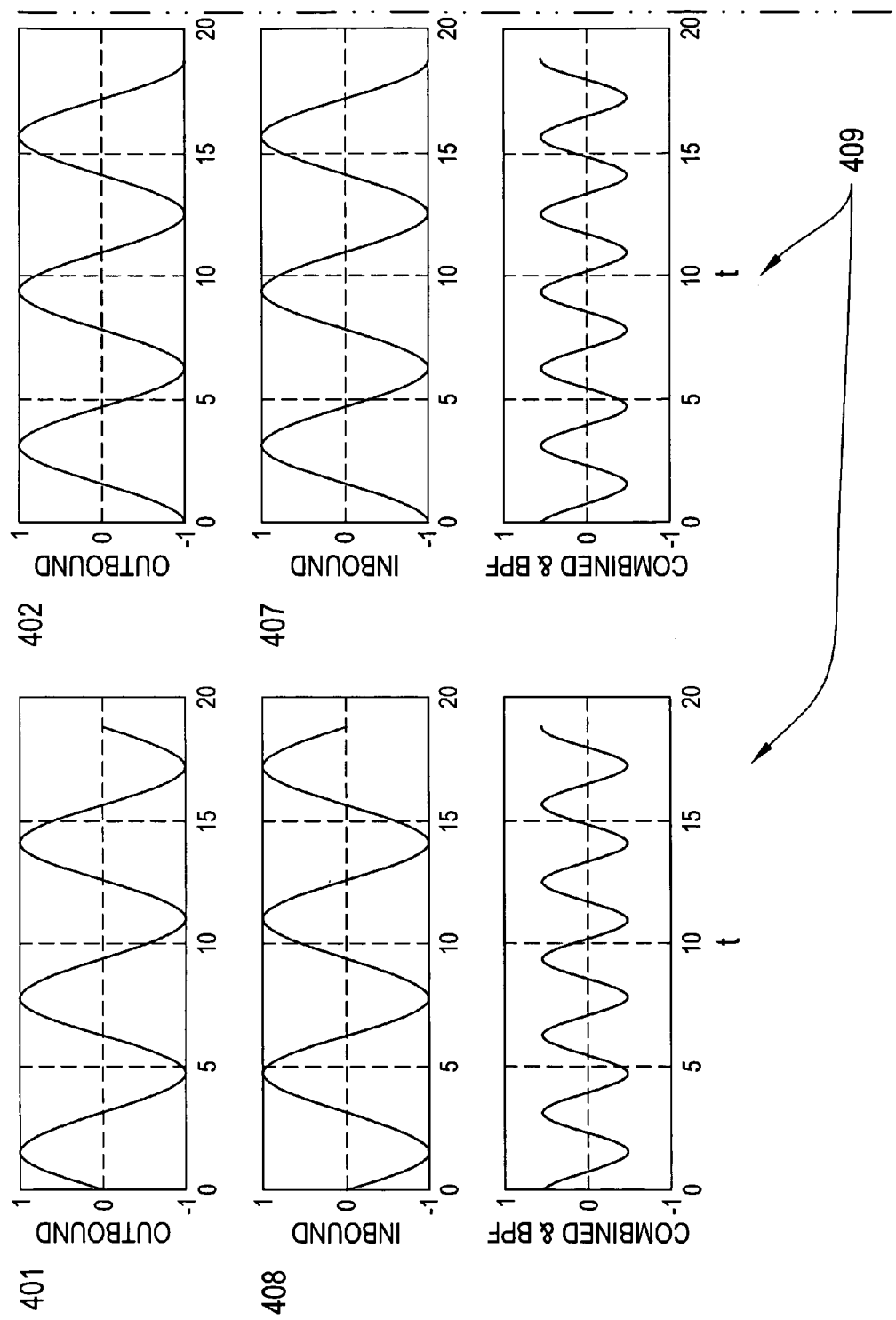
Figure 4B (part 1)

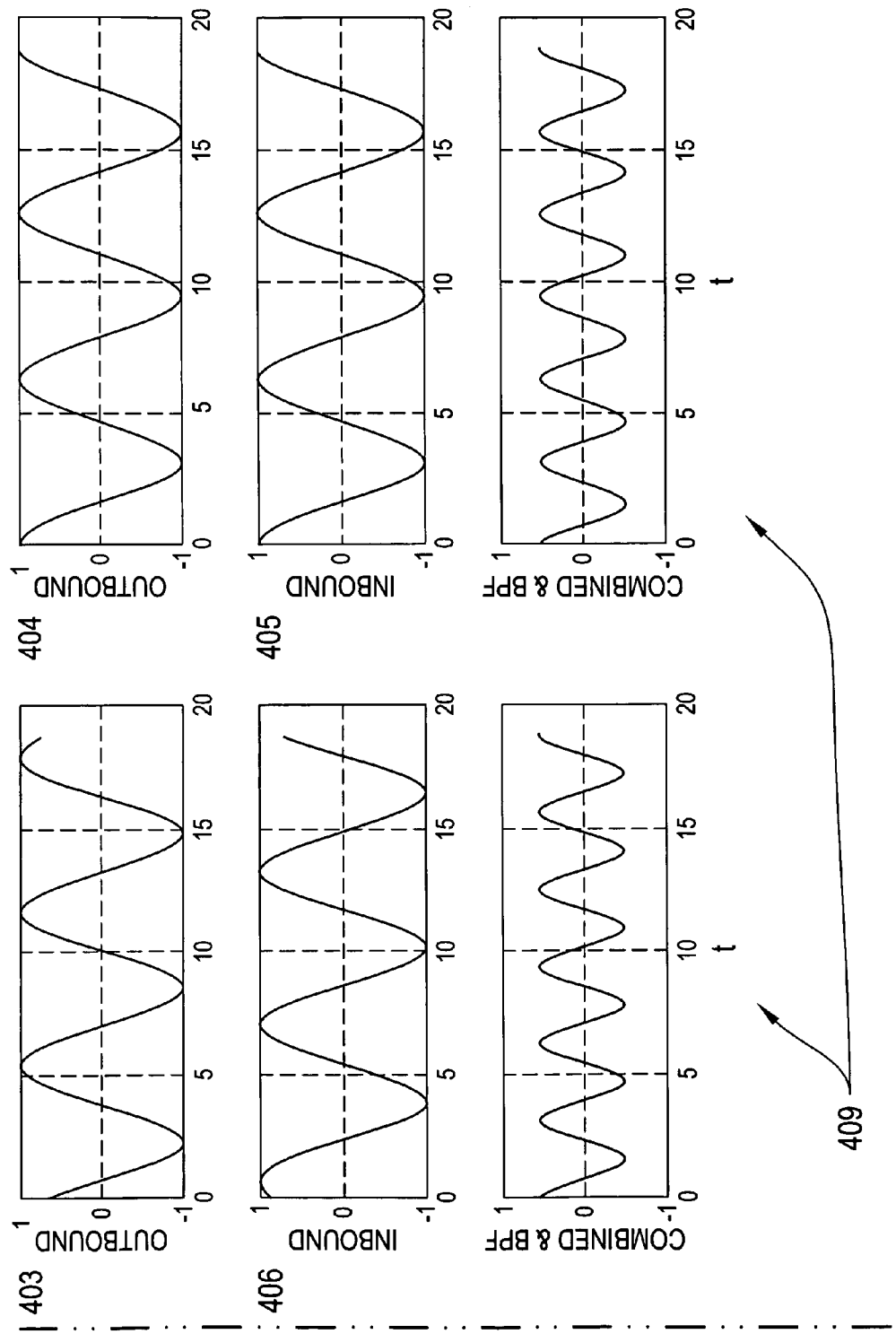
Figure 4B (part 2)

METHODS AND SYSTEMS FOR DISTRIBUTED SYNCHRONIZATION

GOVERNMENT CONTRACT

The U.S. Government has a paid-up license in this invention and the right in limited circumstances to require the patent owner to license others on reasonable terms as provided for by the terms of Contract No. FA8750-08-C0241 awarded by the Defense Advanced Research Projects Agency.

FIELD OF THE INVENTION

The present invention is directed to obtaining a synchronized signal in a distributed fashion and using the synchronized signal for beamforming.

BACKGROUND OF THE INVENTION

The transition from centralized control to distributed decision-making has been one of the most important engineering developments to occur in recent decades. In many complex systems, de-centralizing the system's behavior improves flexibility and robustness while simultaneously decreasing the size and cost of the individual devices. In order for a set of distributed devices to coordinate, most distributed systems require a means of synchronizing operations across devices. Many such systems assume the availability of a single signal which is available to all of the distributed devices. Obtaining such a synchronized signal in a distributed system is a long-standing engineering challenge. Traditional approaches have either required some measure of centralized recalibration over the local oscillators that time operations at each individual device, or assume the perfect synchrony of such oscillators as a matter of design. The former approach fails to achieve true de-centralization, and the latter approach is unachievable in practice.

Beamforming, the creation of a coherent beam at a target location by the calculated interference of beams generated by a set of distributed devices, has important applications in communications, geolocation and defense systems. Traditional beamforming systems follow either a standard or a retrodirective paradigm. Traditional standard beamforming techniques are able to create a coherent beam at an arbitrary target location, but require precise knowledge of the position of each of the individual devices. Traditional retrodirective beamforming techniques do not require any knowledge of the positions of the individual devices, but require a single beacon emitting a periodic signal at a fixed frequency and are limited to creating a coherent beam with that same fixed frequency at the location of the beacon. These techniques have failed to achieve the important goals of repositioning the coherent beam at a location different from the beacon location, or at a frequency different from the beacon frequency, without precise knowledge of the device positions. The deficiencies in traditional approaches to distributed synchronization and beamforming are addressed by the invention described herein.

SUMMARY OF THE INVENTION

The invention provides a set of techniques for obtaining a synchronized signal in a distributed fashion. The methods and systems described herein allow a node to obtain a periodic signal that would be synchronized with the periodic signal obtained at another node when both nodes follow the same synchronizing procedure, without the need for centralized control of both nodes or the need for all nodes to have coordinated local oscillators. The invention includes beamforming methods and systems for producing a coherent beam at a target location and at a target frequency using the synchronized signal.

According to one aspect, the invention relates to a method for obtaining a synchronized periodic signal among a set of nodes including a plurality of nodes. According to one embodiment, each of the nodes is associated with a corresponding local oscillator which is independent of the local oscillators corresponding to other nodes.

For each of the nodes in a subset of the set of nodes, an associated previous node and an associated next node are identified. To obtain the synchronized periodic signal, each node receives a first signal transmitted by the associated previous node and transmits the first signal to the associated next node. According to one embodiment, the synchronized periodic signal has a fundamental frequency that is twice the frequency of the first signal.

Each node also receives a second signal transmitted by the associated next node and transmits the second signal to the associated previous node. According to one embodiment, the second signal has a fundamental frequency that is the same as a fundamental frequency of the first signal, but with an arbitrary phase shift. According to another embodiment, transmitting a signal between nodes involves generating a periodic extension of a received signal. According to another embodiment, each of the nodes uses its corresponding local oscillator to estimate the frequency and phase shift of a received signal.

Each node then combines the first signal and the second signal. According to one embodiment, the first and second signals are multiplied. Finally, each node filters the combination of the first signal and the second signal to obtain a synchronized periodic signal. According to one embodiment, filtering involves applying one of a high-pass filter and a band-pass filter to remove lower frequency components. According to another embodiment, the steps of generating the synchronized periodic signal at each of the nodes are performed according to a pipelining protocol. According to another embodiment, the method includes, at each of the nodes, frequency-shifting and phase-shifting the synchronized periodic signal and transmitting the frequency- and phase-shifted signal to achieve a coherent beam at a target location upon combination of the transmitted signals from each of the nodes.

According to another aspect, the invention relates to a method for obtaining a synchronized periodic signal at a node. A round-trip transmission is initiated of a first periodic signal, with a first fundamental frequency, from a first node to a final node via a plurality of additional nodes according to a first order. The node receives a second periodic signal, with a second fundamental frequency, originating from the final node via the plurality of additional nodes according to a second order reverse of the first order. The node combines the first periodic signal with the second periodic signal, then filters the combined signal to obtain a periodic signal which would be synchronized with a signal at any of the plurality of additional nodes, such signal obtained at such node by combining and filtering the first periodic signal with the second periodic signal as received by such additional node.

According to a further aspect, the invention relates to a method for beamforming. A synchronized periodic signal is obtained across a plurality of nodes. According to one embodiment, the locations of each node are known to within an accuracy of 15 m. Each node receives a beacon signal transmitted from a beacon location. According to one embodiment, the beacon signal is periodic with fundamental frequency in the range of 27 MHz to 5.8 GHz. Each node combines the received beacon signal and the synchronized periodic signal. Each node filters the combination of the received beacon signal and the synchronized periodic signal. Each node phase-shifts the filtered combination of the received beacon signal and the synchronized periodic signal based on a target location, where the target location is different from the beacon location. According to one embodiment, the target location is a communications device. According to another embodiment, each node modulates the phase-shifted, filtered, combined signal with a data signal. Finally, each node transmits the phase-shifted, filtered combined signal to achieve a coherent combination at the target location. According to one embodiment, the method includes phase-shifting, at each node, the phase-shifted, filtered combined signal based on a target frequency, where the target frequency is different from a fundamental frequency of the beacon signal. According to further embodiments, the target frequency is a jamming frequency or a radio frequency.

According to another aspect, the invention relates to a system for obtaining a synchronized periodic signal at a first node. According to one embodiment, the first node is an unmanned vehicle. According to another embodiment, the first node is a relay in a distributed communication system. The system includes a memory, a receiver, a transmitter and a processor. The processor is configured to retrieve, from memory, a first order of a plurality of additional nodes; initiate, with the transmitter, a round-trip transmission of a first periodic signal from the first node to a final node via a plurality of additional nodes according to the predetermined first order; receive, with the receiver, a second periodic signal originating from the final node via the plurality of additional nodes according to a second order reverse of the first order; combine the first periodic signal with the second periodic signal; and filter the combined signal to obtain a periodic signal which would be synchronized with a signal at any of the plurality of additional nodes formed by combining and filtering the first periodic signal with the second periodic signal as received by such additional node.

According to another aspect, the invention relates to a system for beamforming which includes a plurality of nodes. According to one embodiment, each node is an unmanned vehicle. According to another embodiment, each node is a relay in a distributed communication system. Each node includes a memory, a receiver, a transmitter and a processor. The processor is configured to obtain a synchronized periodic signal across the plurality of nodes; receive, with the receiver, a beacon signal transmitted from a beacon location; combine the received beacon signal and the synchronized periodic signal; filter the combination of the received beacon signal and the synchronized periodic signal; phase-shift the filtered combination of the received beacon signal and the synchronized periodic signal based on a target location, wherein the target location is different from the beacon location; and transmit, with the transmitter, the phase-shifted, filtered combined signal to achieve a coherent combination at the target location.

According to another aspect, the invention relates to a computer readable medium storing computer executable instructions, which, when executed by a processor, cause the processor to carry out a method for obtaining a synchronized periodic signal at a first node. The method includes a node initiating a round-trip transmission of a first periodic signal from a first node to a final node via a plurality of additional nodes according to a first order. The node receives a second periodic signal originating from the final node via the plurality of additional nodes according to a second order reverse of the first order. The node combines the first periodic signal with the second periodic signal, then filters the combined signal to obtain a periodic signal which would be synchronized with a signal at any of the plurality of additional nodes, such signal obtained at such node by combining and filtering the first periodic signal with the second periodic signal as received by such node.

According to another aspect, the invention relates to a computer readable medium storing computer executable instructions, which, when executed by a processor, cause the processor to carry out a method for beamforming. The method includes obtaining a synchronized periodic signal across at least one node and receiving a beacon signal transmitted from a beacon location. The received beacon signal and the synchronized periodic signal are combined and the combination is filtered. The filtered combination of the received beacon signal and the synchronized periodic signal is phase-shifted based on a target location, where the target location is different from the beacon location. Finally, the phase-shifted, filtered combined signal is transmitted to achieve a coherent combination at the target location.

BRIEF DESCRIPTION OF THE DRAWINGS

The above and other features of the present invention, its nature and various advantages will be more apparent upon consideration of the following detailed description, taken in conjunction with the accompanying drawings in which:

FIGS. 4A-4B depict a signal path and signals in a round-trip synchronization process according to an illustrative embodiment of the invention;

DETAILED DESCRIPTION

To provide an overall understanding of the invention, certain illustrative embodiments will now be described, including methods and systems for distributed synchronization. However, it will be understood by one of ordinary skill in the art that the systems and methods described herein can be adapted and modified for other suitable applications and that such other additions and modifications will not depart from the scope hereof.

Figure 1:
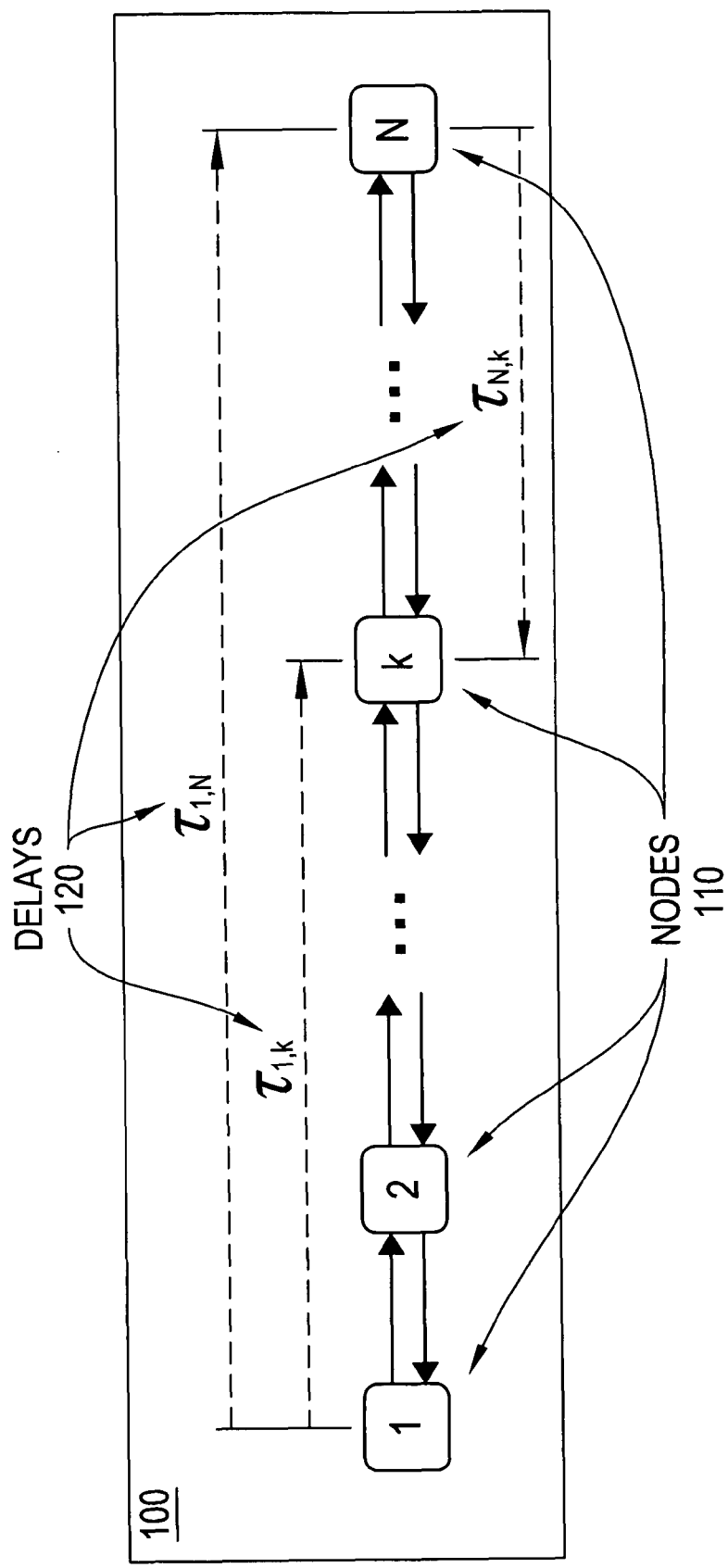
FIG. 1 is a diagram of a communication configuration that will allow a set of nodes to obtain a synchronized signal in accordance with an illustrative embodiment of the invention.

FIG. 1 is a diagram of a communication configuration that will allow a set of nodes to obtain a synchronized signal in accordance with an illustrative embodiment of the invention. In the configuration 100, a set of nodes 110 are labeled sequentially from 1 to N, where N is an integer greater than one. The node labeled k will be referred to as Node k. Each of the nodes 110 can communicate with a subset of the other nodes, where the ability of a first node to communicate with a second node includes the ability to send a signal from the first node to the second node and the ability to receive a signal at the first node from the second node. Any given node can communicate with nodes whose labels are immediately prior to and immediately following the label of the given node. For example, Node 3 can communicate with Node 2 and Node 4. Node 1 can communicate with Node 2, and Node N can communicate with Node N-1. In FIG. 1, these communication channels are illustrated by the pairs of arrows. Although additional communication channels are not depicted in FIG. 1, any given node may be able to communicate with many additional nodes and fully remain within the scope of the invention. The nodes 110 in FIG. 1 are depicted as being arranged in a line for convenience of representation only. The invention described herein applies to nodes 110 located in any physical arrangement. In particular, the nodes physically closest to any given node may not be the one node (if the given node is Node 1 or Node N) or two nodes (if the given node is any other node) with which the given node is known to have the ability to communicate.

Communication between any two of the nodes 110 is characterized by an associated time delay. This time delay arises because any kind of signal travels at a finite speed between its source and its destination, with the speed depending upon, among other factors, the nature of the signal and the medium through which it propagates. In one exemplary embodiment, the invention can be applied to communication between unmanned aerial vehicles (UAVs), in which radio frequency signals travel through the atmosphere at roughly 300 million m/s. In such an embodiment, if Node 1 and Node 2 are embedded in two separate UAVs located 3000 m apart, the electromagnetic wave transmitted by Node 1 will be received by Node 2 after a time delay of roughly 10 microseconds. This is the same time delay experienced by an electromagnetic wave transmitted by Node 2 before it is received at Node 1. Therefore, the time delay associated with communication between Node 1 and Node 2 is 10 microseconds. For clarity, FIG. 1 depicts only a few of such time delays 120 associated with communication between several pairs of nodes, illustrated by the dashed arrows, and uses the symbol $\tau_{j,k}$ to represent the time delay associated with communication between Node j and Node k.

Figure 2:
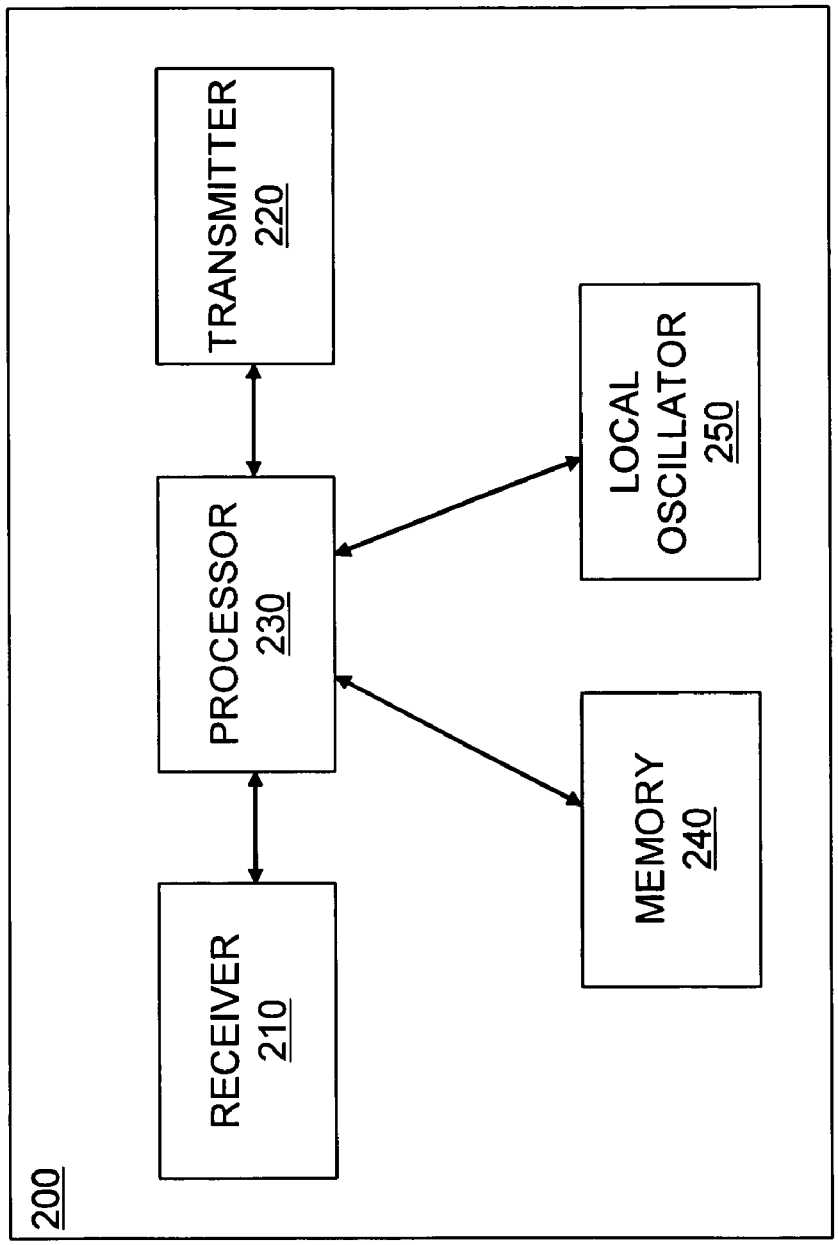
FIG. 2 is a schematic diagram of the components included in a node according to an illustrative embodiment of the invention.

FIG. 2 is a schematic diagram of the components included in a node according to an illustrative embodiment of the invention. Node 200 includes receiver 210, transmitter 220, processor 230, memory 240 and local oscillator 250. Receiver 210 is a device used to receive a transmitted signal from another node in communication with the depicted node 200 and transmitter 220 is a device used to transmit a signal to another node from the depicted node 200. For any given node, receiver 210 and transmitter 220 need not receive and transmit, respectively, the same type of signal. For example, receiver 210 may receive radio frequency signals while transmitter 220 may transmit acoustic signals. One of ordinary skill in the art will readily identify additional types of signals within the invention, including any electromagnetic signal, motion signals, thermal signals, and pressure signals. These signals may be analog or digital. Although the receiver 210 is depicted as a single unit, it may comprise more than one sub-receivers, each of which is capable of receiving a different or same type of signal. Analogously, transmitter 220 may comprise more than one sub-transmitter, each of which is capable of receiving a different or same type of signal. Receiver 210 and transmitter 220 may also be combined into a single transceiving device. Additionally, the type of signal used to transmit a signal from a first node to a second node may be different from the type of signal used to transmit a signal from the second node to the first node. For example, Node 1 may transmit radio frequency signals to Node 2 while Node 2 transmits acoustic signals to Node 1.

Processor 230 is operationally connected to both receiver 210 and transmitter 220 and is capable of manipulating the signal received by receiver 210 and generating a signal to be transmitted by transmitter 220. Processor 230 performs the methods described herein by executing instructions stored on a computer-readable medium. One of ordinary skill in the art will recognize that such media may include, without limitation, solid-state, magnetic, holographic, magneto-optical and optical memory units. Processor 230 is also operationally connected to memory 240. Memory 240 is a data storage device to be used by processor 230 and can store computer-executable instructions embodied in a computer-readable medium. Processor 230 is also operationally connected to local oscillator 250, a device that produces a clock signal for the node. Exemplary embodiments of local oscillator 250 include electrical and mechanical resonators or any device capable of producing a periodic oscillation, e.g. the node's system clock. In an exemplary embodiment of the present invention, each node contains its own local oscillator 250 which is independent in frequency and phase from the local oscillator 250 at any other node. However, local oscillator 250 need not be physically coupled to the system of FIG. 2, nor do the local oscillators for different nodes need be distinct.

Although FIG. 2 depicts receiver 210, transmitter 220, processor 230, memory 240 and local oscillator 250 as separate units, one skilled in the art will recognize that many combinations of these elements may be combined in any given physical embodiment without departing from the scope of the invention. For example, processor 230, memory 240 and local oscillator 250 may be part of a general purpose processor with an internal clock. Processor 230 may additionally comprise sub-processors for performing different tasks, including controlling each of receiver 210 and transmitter 220 and generating a signal to be transmitted. In one embodiment, a sub-processor of processor 230 is located in a processing facility and performs computations which are wirelessly transmitted to sub-processors of processor 230 physically coupled to each of receiver 210 and transmitter 220 to control each of these devices. Each of receiver 210 and transmitter 220 may be operationally connected to additional data storage units for the purpose of receipt and transmission, respectively. For example, many digital transmitters include a buffer to store a quantity of data to ensure smooth transmission in case of an interruption in the data supply.

A node as depicted in FIG. 2 can be embedded within a wide range of other devices, including manned and unmanned vehicles (e.g. aerial, terrestrial, lighter-than-air, underwater, space), cellular telephones, computers, radios, antennas, circuit boards, as well as application-specific devices.

Figure 3:
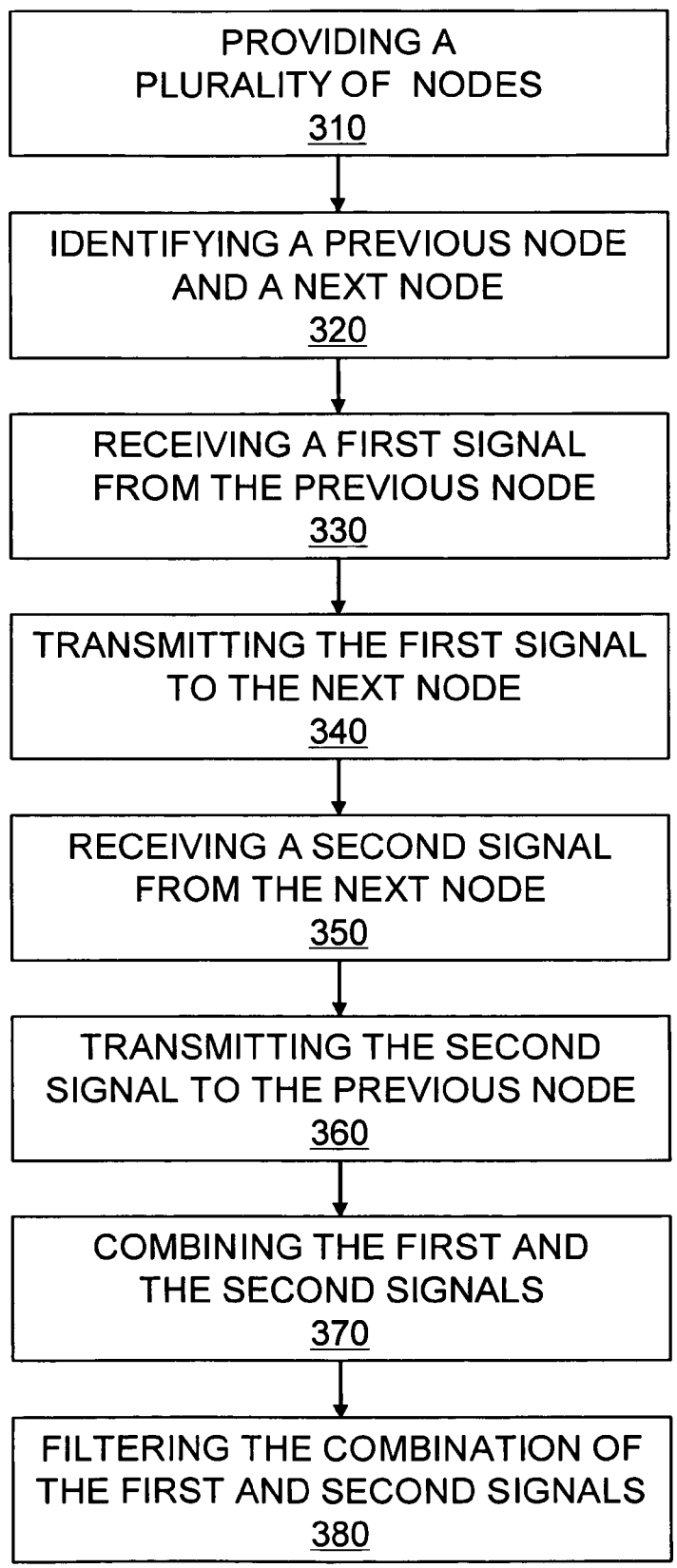
FIG. 3 is a flow chart of the steps performed by a node to obtain a synchronized signal in accordance with an illustrative embodiment of the invention.

FIG. 3 is a flow chart of the steps performed by a node to obtain a synchronized signal in accordance with an illustrative embodiment of the invention. First, a set of nodes including a plurality of nodes 1, ..., N is provided 310. In one embodiment, the plurality of nodes may be identified by an ordered list of nodes. Alternatively, the plurality of nodes may be identified dynamically by network topology or other environmental information. Next, for each node in a subset of the set of nodes, an associated previous node and an associated next node is identified 320. For example, Node 3 will have Node 2 as its associated previous node and Node 4 as its associated next node. Node 1 will have Node 1 as its associated previous node and Node N will have Node N as its associated next node.

Next, a synchronized periodic signal is generated by, at each node, the respective node receiving a first signal transmitted by an associated previous node 330; transmitting the first signal to the associated next node 340; receiving a second signal transmitted by the associated next node 350; transmitting the second signal to the associated previous node 360; combining the first and second signals 370; and filtering the combined signal 380. The result, at each node in the subset, is a filtered, combined signal that is synchronized with the filtered, combined signal obtained at the other nodes in the subset carrying out this process.

Two illustrative embodiments of this synchronization procedure will be discussed in more detail below: a round-trip synchronization methodology and a two-way synchronization methodology. In round-trip synchronization, a signal is transmitted from a first node to a final node in an "east" pass. Once the "east" pass is complete, the signal is retransmitted through all of the nodes in a "west" pass, where the order of transmission by nodes in the "west" pass is the reverse of the order of transmission in the "east" pass. In two-way synchronization, an "east" pass proceeds as in round-trip synchronization, but a different signal is used by the final node to make the "west" pass, with the "east" and "west" passes able to occur simultaneously. Coordination of the communication between nodes in the "east" and "west" passes can be achieved in several ways in accordance with the invention, including embodiments which apply TDMA, FDMA and CDMA protocols. In a further embodiment, the communication between nodes in the "east" and "west" passes is coordinated according to a pipelining protocol, wherein, for example, Node 1 may initiate multiple communications within the time required for a pass to be completed. This embodiment allows more rapid synchronization cycles that can be performed with greater frequency.

Figure 4A:
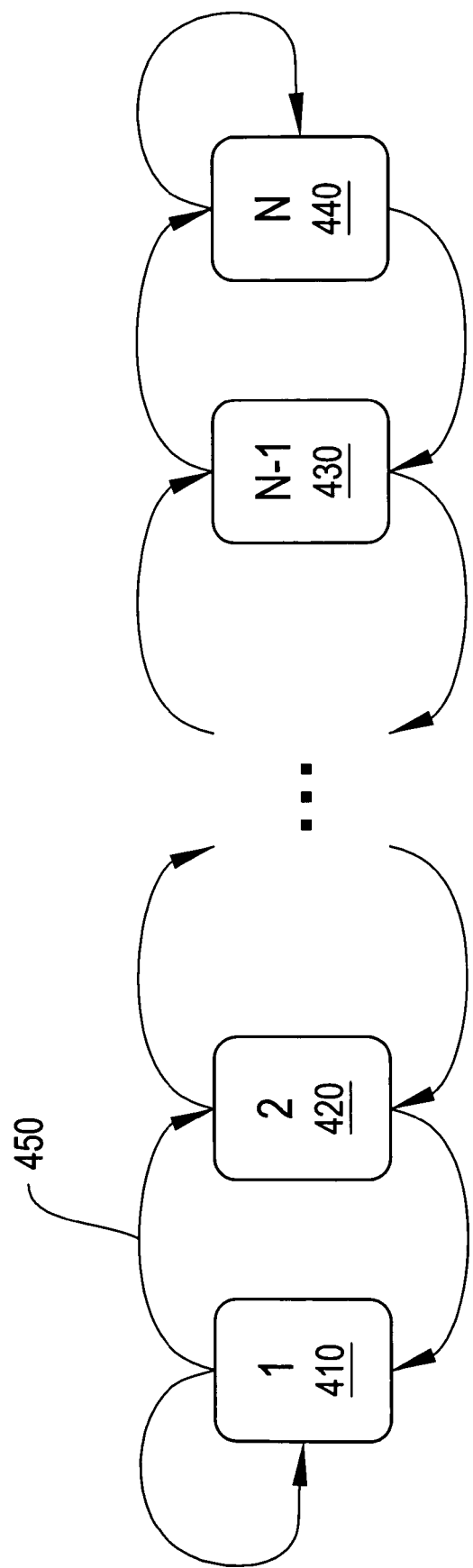

FIGS. 4A-4B depict a signal path and signals in a round-trip synchronization process according to an illustrative embodiment of the invention. FIG. 4A is a diagram of the signal path for an first embodiment of the synchronization system of FIG. 3 based on a round-trip synchronization methodology. FIG. 4B illustrates the signals received and transmitted at several points within the system. Specifically, FIG. 4A depicts a series of N nodes 410-440 transmitting signals (e.g. signal 450 from node 1 410 to node 2 420) according to an ordered list (see step 310).

Walking through the remaining steps of FIG. 3 in relation to FIGS. 4A-4B, in step 340, Node 1 410 transmits a periodic signal to both Node 1 410 and to Node 2 420. Node 1 410 receives this signal 401 (step 330) without delay. Node 2 420 receives the signal 402 (step 330) after a time delay of $\tau_{1,2}$. Node 2 420 then transmits the received signal to Node 4 (step 340). This is repeated at each of the nodes as the signal propagates from Node 1 410 to Node N 440 between pairs of nodes, incurring a time delay in the transmission between each pair.

Once the signal is received by Node N 440 (step 330), Node N 440 transmits the received signal 404 to both Node N 440 and Node N-1 430 (step 340). Node N receives this signal 405 (step 350) without delay. Node N-1 430 receives the signal 406 (step 350) after a time delay of $\tau_{N,N-1}$ and retransmits the received signal to Node N-2 (step 360). This is repeated at each of the nodes as the signal propagates from Node N 440 to Node 1 410 between pairs of nodes, incurring a time delay in the transmission between each pair. In one embodiment, after receipt of a signal, a node transmits the received signal immediately. In an alternate embodiment to be discussed below, after receipt of a signal, a node transmits the periodic extension of the received signal after a transmission delay, distinct from the time delays discussed previously.

Once each of the N nodes 410-440 has received two signals (for Node 1 410 and Node N 440, one of the two received signals will have come from the node itself), processor 230 at each node combines the two received signals (step 370), then filters the combination (step 380) to obtain a third signal 409. This third signal 409 is essentially identical at all of the nodes, i.e. the third signal 409 is synchronized across all of the nodes, sharing a common frequency and phase.

Figure 5:
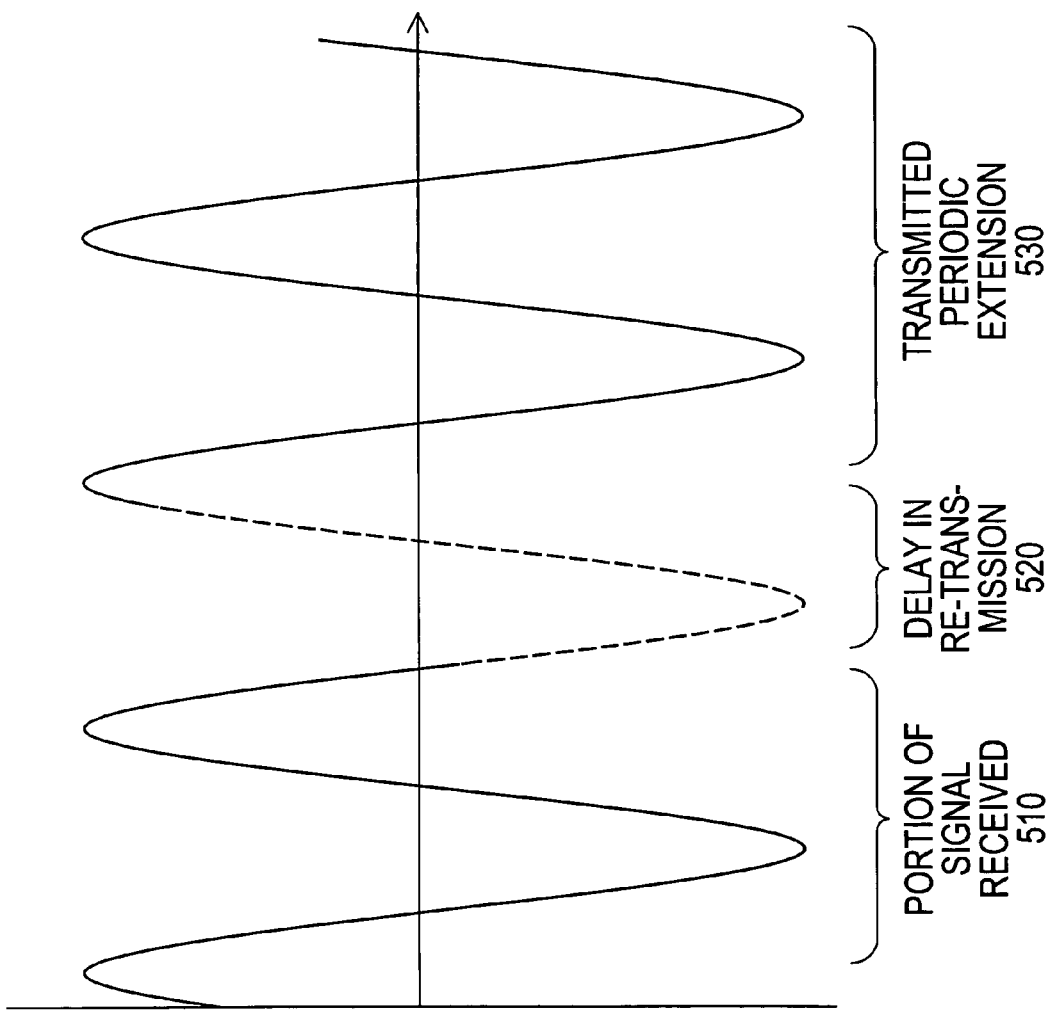
FIG. 5 is a depiction of signals produced by a periodic extension procedure in accordance with an illustrative embodiment of the invention.

FIG. 5 is a depiction of signals produced by a periodic extension procedure in accordance with an illustrative embodiment of the invention. A periodic extension of a received periodic signal is a signal that is equivalent to the continuation of the received signal. That is, the periodic extension shares the same fundamental frequency and is in phase with the received periodic signal. This concept is illustrated in FIG. 5. When a periodic signal is transmitted to a node, the node receives a portion of the signal 510. In order to transmit a periodic extension of the received signal correctly, the node must determine the signal's structure, i.e. the behavior of the signal over a full period and its phase shift. Once the node has determined the signal's structure, it can then retransmit the signal correctly. A transmission delay 520 may occur while the node is making this determination and while the node waits for the appropriate time to begin retransmission. The duration of an acceptable transmission delay 520 depends upon the communication coordination protocol employed by the nodes, as discussed above. For example, if Node 3 is scheduled to receive the signal from Node 2 during a time window that begins T seconds from the time that Node 2 determines the signal sent by Node 1, then Node 2 can delay the transmission of the periodic extension of the signal sent by Node 1 for up to $T-\tau_{2,3}$ seconds. Once transmission begins after the transmission delay 520, the node transmits the periodic extension of the received signal 530. That is, the node transmits a signal 530 having the same frequency and phase as the received signal.

In one embodiment, each node uses its local oscillator 250 to both determine the received signal's structure and transmit the periodic extension. Because the same oscillator is used to both sample and recreate the received signal in such an embodiment, the local oscillators 250 between nodes can operate at different frequencies while still transmitting periodic extensions at the correct frequency for communication to other nodes.

Figure 6:
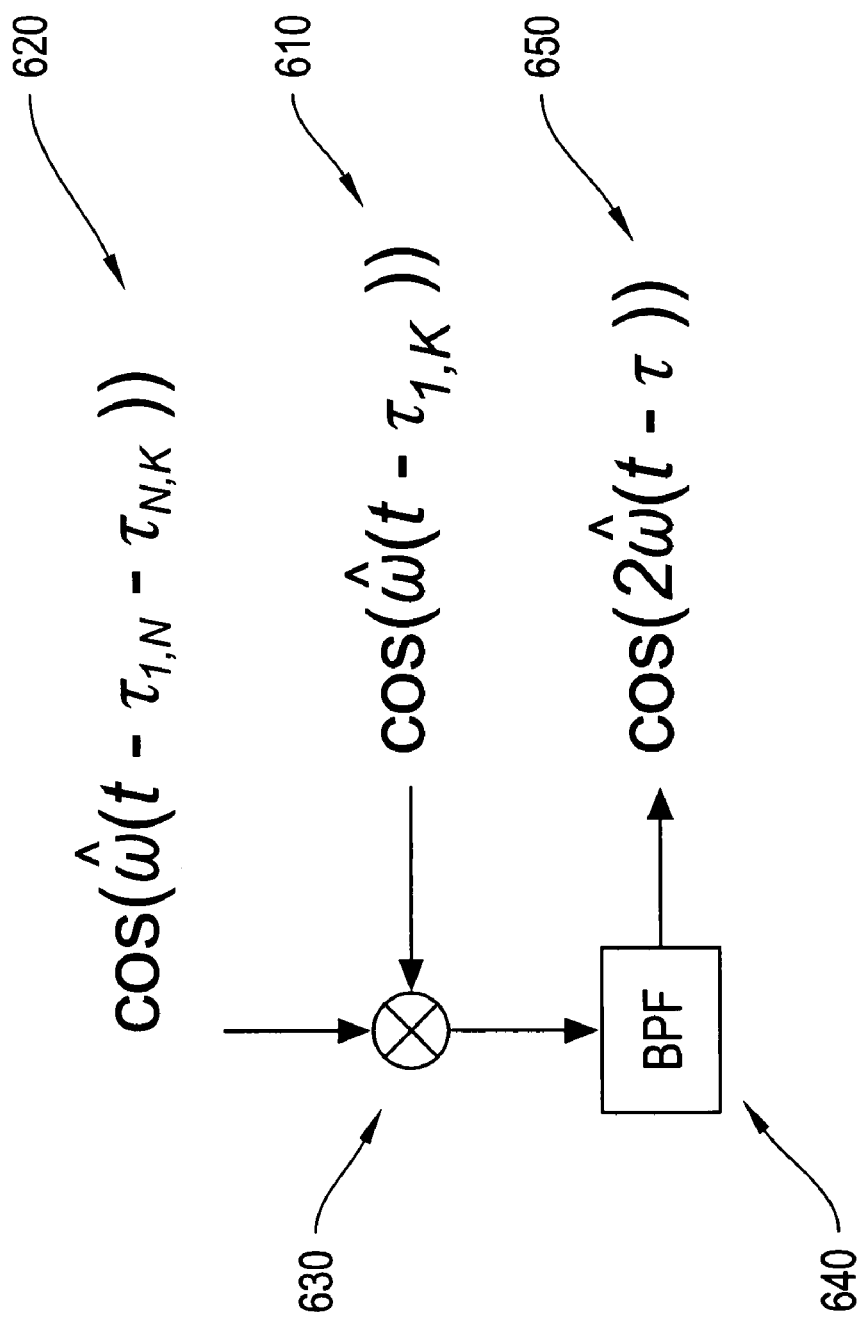
FIG. 6 is a flow diagram of a combining and filtering process in a round-trip synchronization process according to an illustrative embodiment of the invention.

FIG. 6 is a flow diagram of a combining and filtering process in a round-trip synchronization process according to an illustrative embodiment of the invention, as illustrated in FIGS. 3, 4A-4B and as discussed above. For convenience of notation, we will refer to a particular node as Node k, where k can be any number 1, ..., N. The delays between each pair of nodes is assumed to exhibit reciprocity, i.e. $\tau_{j,k}=\tau_{k,j}$ for all pairs of nodes j and k. In FIG. 6, the periodic signal transmitted by Node 1 to both itself and to Node 2 is a pure tone at frequency $\hat{\omega}$, which can be mathematically represented as $$\cos(\hat{\omega} t)$$

where t represents time. A first signal 610 received by a Node k is a delayed version of the signal transmitted by Node 1, where the delay is the sum of all of the delays associated with each pair of nodes between Node 1 and Node k, and can be represented by $$\cos(\hat{\omega}(t-\tau_{1,k})).$$

A second signal 620 received by Node k is a delayed version of the signal transmitted by Node 1, where the delay is the sum of all of the delays associated with each pair of nodes between Node 1 and Node k, plus the sum of all of the delays associated with each pair of nodes between Node k and Node N, plus the sum of all of the delays associated with each pair of nodes between Node N and Node k (on the return trip). This second received signal can be represented by $$\cos(\hat{\omega}(t-\tau_{1,N}-\tau_{N,k})).$$

Next, the node combines the first and second received signals by multiplying the two together using a modulator 630. This combined signal can be represented by $$\frac{1}{2}[\cos(2\hat{\omega}t - \hat{\omega}(\tau_{1,k} + \tau_{1,N} + \tau_{N,k})) + \cos(\hat{\omega}(\tau_{1,k} - \tau_{1,N} - \tau_{N,k}))].$$

The node next applies a filter 640 with a cutoff frequency chosen to eliminate the lower frequency component. In an illustrative embodiment, the cutoff frequency lies in the interval between $\hat{\omega}$ and $2\hat{\omega}$. The filtered signal 650 can be represented by $$\frac{1}{2}\cos(2\hat{\omega}(t - \tau))$$

where $\tau = 2\tau_{1,N}$, the total round-trip delay. By reciprocity, $\tau = \tau_{1,k} + \tau_{1,N} + \tau_{N,k}$ for any Node k. The filtered signal 650 does not depend on k and is therefore the same at all nodes, achieving a synchronized signal.

Figure 7:
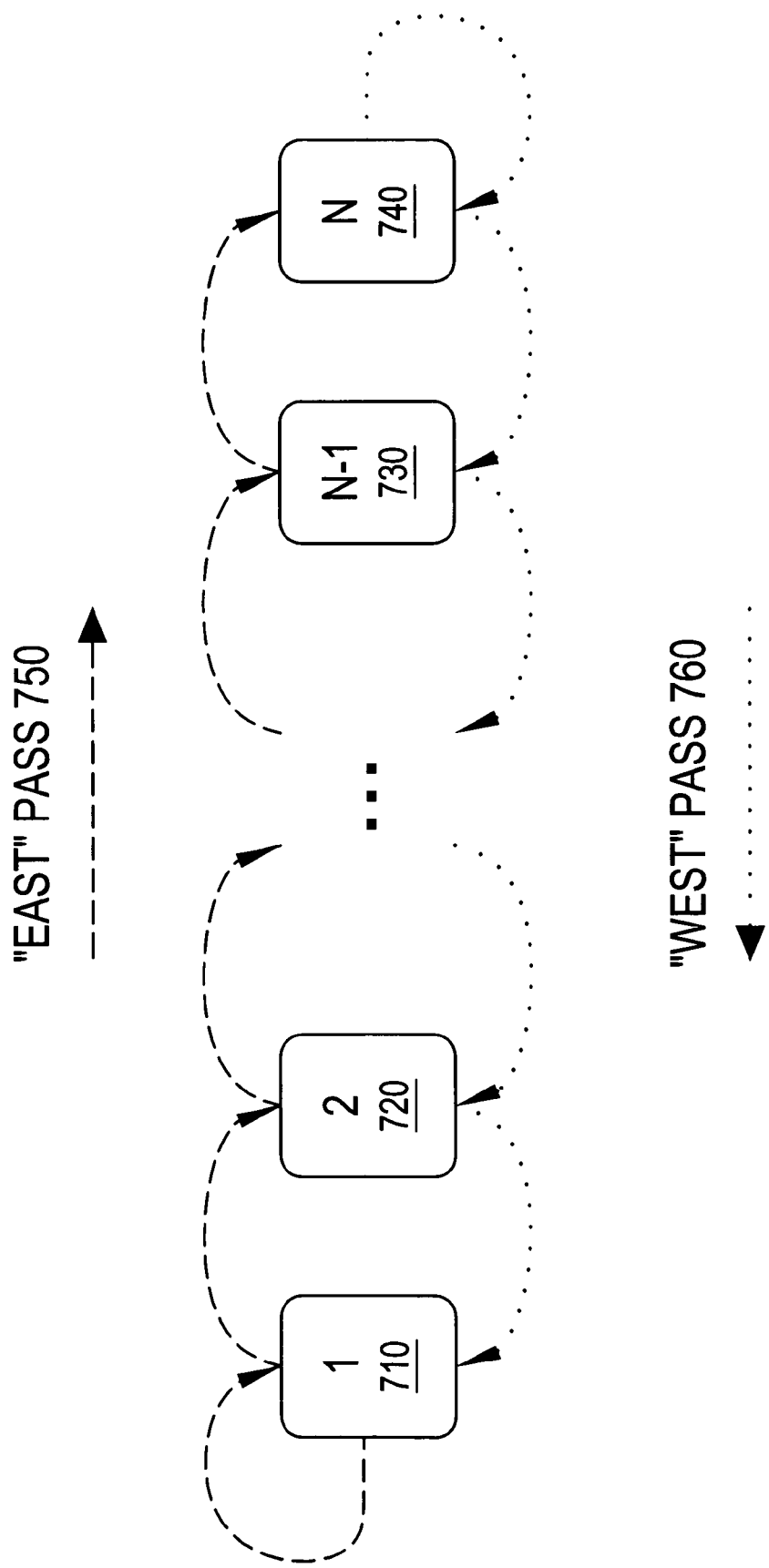
FIG. 7 is a diagram of a signal path in a two-way synchronization process according to an illustrative embodiment of the invention.

FIG. 7 is a diagram of a signal path in a two-way synchronization process according to the illustrative embodiment of the invention of FIG. 3 based on a two-way synchronization methodology. In an "east" pass 750, Node 1 710 transmits a periodic signal to both itself and to Node 2 720 (step 340). Node 1 710 receives this signal (step 330) without delay. Node 2 720 receives this periodic signal after a time delay of $\tau_{1,2}$ (step 330) and transmits the received signal to Node 3 (step 340). This is repeated at each of the nodes as the signal propagates from Node 1 to Node N between pairs of nodes, accumulating a time delay in the transmission between each pair. In FIG. 7, this signal path is indicated by the dashed arrows. In a "west" pass 760, which may occur concurrently with the "east" pass 750, Node N 740 transmits a periodic signal to both itself and to Node N-1 730 (step 340). Node N 740 receives this signal without delay (step 350). Node N-1 730 receives this periodic signal after a time delay of $\tau_{N,N-1}$ (step 350) and transmits the received signal to Node N-2 (step 360). This is repeated at each of the nodes as the signal propagates from Node N 740 to Node 1 710 between pairs of nodes, accumulating a time delay in the transmission between each pair. In FIG. 7, this signal path is indicated by the dotted arrows. In an alternate embodiment, after receipt of a signal, a node transmits the periodic extension of the received signal.

Once each of the nodes 1, . . . , N has received two signals (for each of Node 1 710 and Node N 740, one of the two received signals will have come from the node itself), processor 230 at each node combines the two received signals (step 370), then filters the combination to obtain a third signal (step 380). This third signal is identical at all of the nodes, i.e. the third signal is synchronized across all of the nodes.

Figure 8:
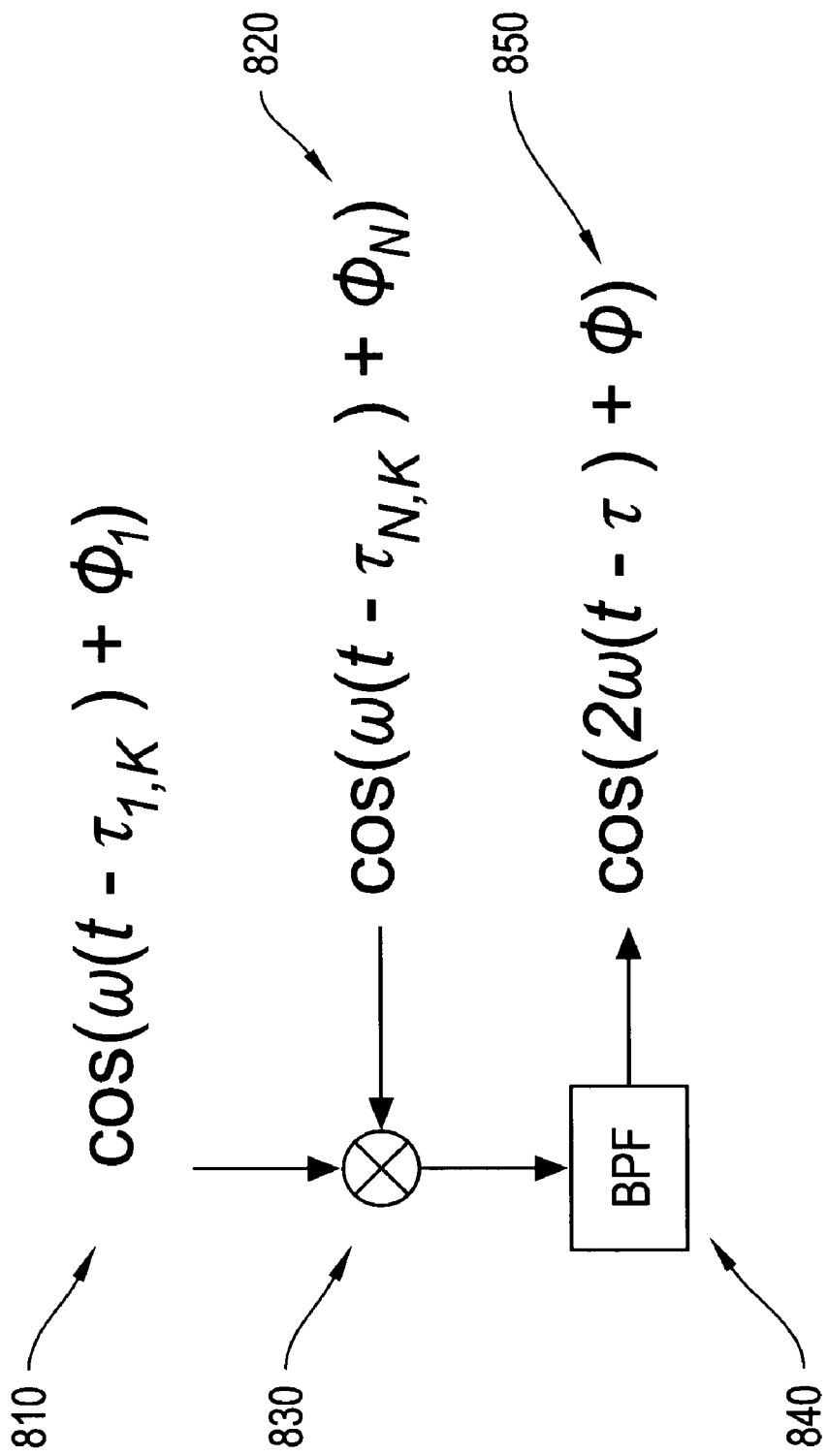
FIG. 8 is a flow diagram of a filtering and combining process in a two-way synchronization process according to an illustrative embodiment of the invention.

FIG. 8 is a flow diagram of a filtering and combining process in a two-way synchronization process according to an illustrative embodiment of the invention as illustrated in FIG. 7 and discussed above. For convenience of notation, we will refer to this node as Node k, where k can be any number 1, . . . , N. In FIG. 8, the periodic signal transmitted by Node 1 to both itself and to Node 2 is a pure tone at frequency $\omega$, which can be mathematically represented as $$\cos(\omega t + \phi_1)$$

where t represents time and $\phi_1$ is an arbitrary phase shift. A first signal 810 received by Node k is a delayed version of the signal transmitted by Node 1, where the delay is the sum of all of the delays associated with each pair of nodes between Node 1 and Node k, and can be represented as $$\cos(\omega(t-\tau_{1,K})+\phi_1).$$

In FIG. 8, the periodic signal transmitted by Node N to both itself and to Node N-1 is a pure tone at frequency $\omega$, which can be mathematically represented as $$\cos(\omega t + \phi_N)$$

where $\phi_N$ is an arbitrary phase shift. Observe that, in this embodiment, the frequency of the tone transmitted by Node N must be the same as the frequency of the tone transmitted by Node 1, although their phase shifts need not be the same. A second signal 820 received by Node k is a delayed version of the signal transmitted by Node N, where the delay is the sum of all of the delays associated with each pair of nodes between Node N and Node k. This second received signal can be represented by $$\cos(\omega(t-\tau_{N,K})+\phi_N).$$

Next, Node k combines the first and second received signals by multiplying the two together with modulator 830. This combined signal can be represented by $$\frac{1}{2}[\cos(2\omega t - \omega(\tau_{1,k} + \tau_{N,k}) + \phi_1 + \phi_N) + \cos(\omega(\tau_{1,k} - \tau_{N,k}) + \phi_N - \phi_1)]$$

The node next applies a filter 840 with a cutoff frequency chosen to eliminate the lower frequency components. In an illustrative embodiment, the cutoff frequency lies in the interval between $\omega$ and $2\omega$. The filtered signal 850 can be represented by $$\frac{1}{2}\cos(2\omega(t - \tau) + \phi)$$

where $\tau = \tau_{1,N}$, the total one-way delay and $\phi = \phi_1 + \phi_N$. By reciprocity, $\tau = \tau_{1,k} + \tau_{N,k}$ for any Node k. The filtered signal 850 does not depend on k and is therefore the same at all nodes, achieving a synchronized signal.

Figure 9:
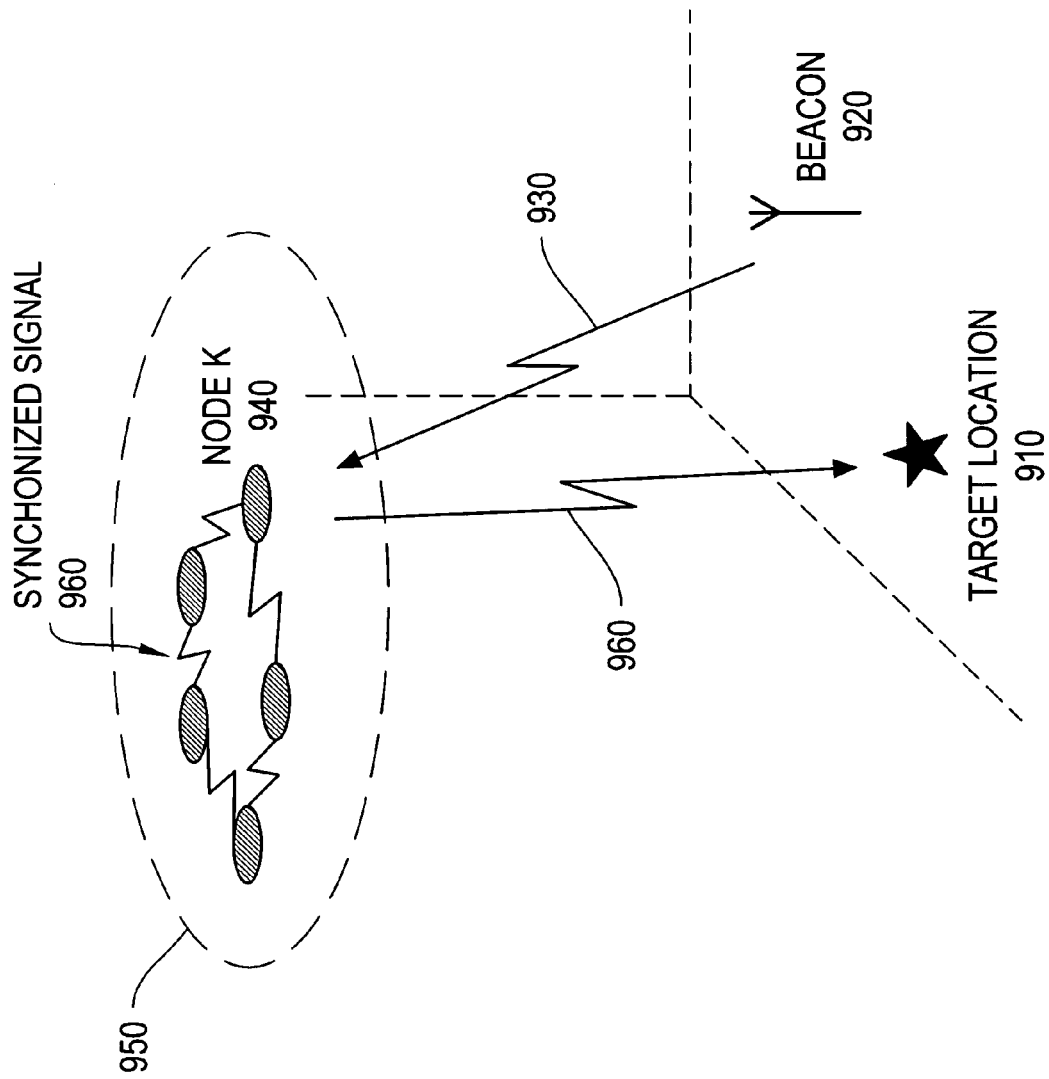
FIG. 9 depicts a beamforming system in accordance with an illustrative embodiment of the invention.

FIG. 9 depicts a beamforming system 900 in accordance with an illustrative embodiment of the invention that leverages the synchronization processes described above. The goal of the depicted system is to produce a beam at a target location 910 at a target frequency using the signal transmitted by the beacon 920. The system includes a plurality of nodes 950, configured as described above, to obtain a synchronized signal. Each of the nodes 950 receives a signal transmitted from the beacon 920. For simplicity, only the signal 930 transmitted from the beacon location 920 to an arbitrary Node k 940 is depicted in FIG. 9.

The individual signals transmitted by each of nodes 950 will combine coherently at the target location. The principle behind this coherent combination is that each node will phase shift the signal that it transmits to the target location based on its distance from the target location so that the signals transmitted by all of the nodes will align constructively when they arrive at the target. For simplicity, only the signal 960 transmitted from Node k 940 to the target location 910 is depicted in FIG. 9. Each node has available a synchronized signal 960 (obtained as described in FIG. 3) and the beacon signal as received at that node. Each node 950 must choose the phase and frequency of the signal it will transmit to achieve a coherent combination of all transmitted signals at the target location 910 and target frequency. To do this, each node combines the synchronized signal and the beacon signal as received, filters the combination, and introduces a phase shift based on the target frequency and target location. Each node then transmits the resulting phase-shifted, filtered combined signal, resulting in coherent combination of all signals at the target location 920 and frequency. A discussion of an exemplary combining, filtering and phase-shifting procedure is provided below.

Figure 10:
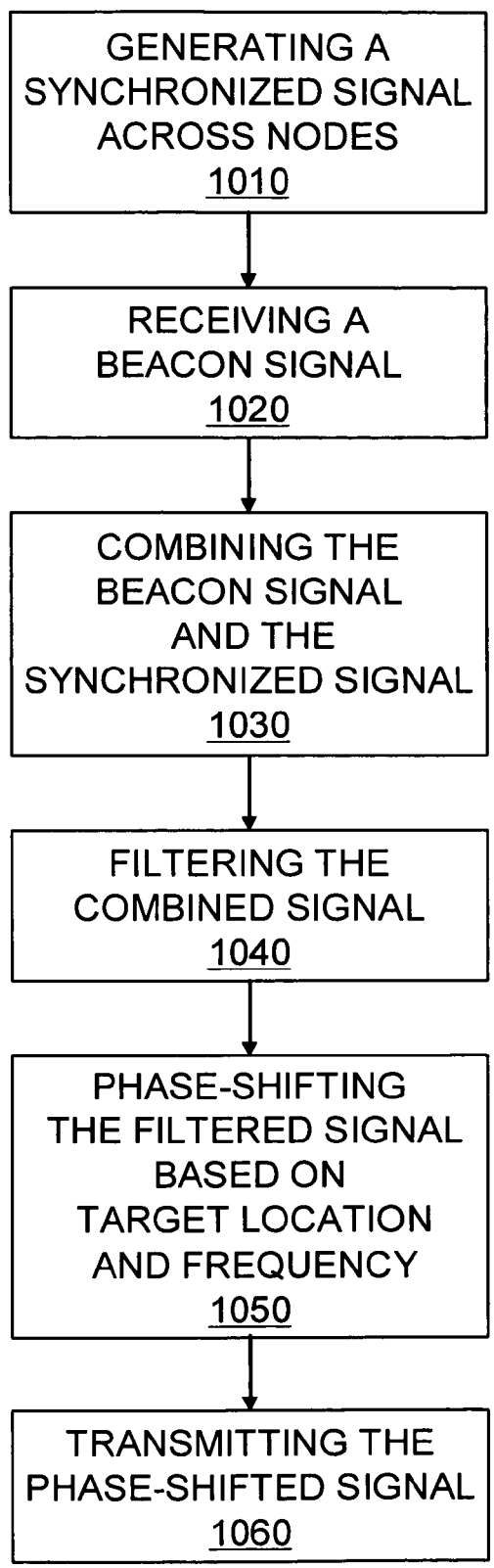
FIG. 10 is a flow chart of a method for beamforming in accordance with an illustrative embodiment of the invention.

FIG. 10 is a flow chart of a method for beamforming in accordance with an illustrative embodiment of the invention. First, a synchronized periodic signal is obtained across the nodes (step 1010). Next, each node receives a beacon signal (step 1020) and combines the beacon signal with the synchronized signal (step 1030). At each node, the combined signal is next filtered (step 1040), then phase-shifted based on the node's location, the target location and the target frequency (step 1050). Finally, each node transmits the phase-shifted signal (step 1060) to achieve coherent combination at the target location and target frequency.

Figure 11:
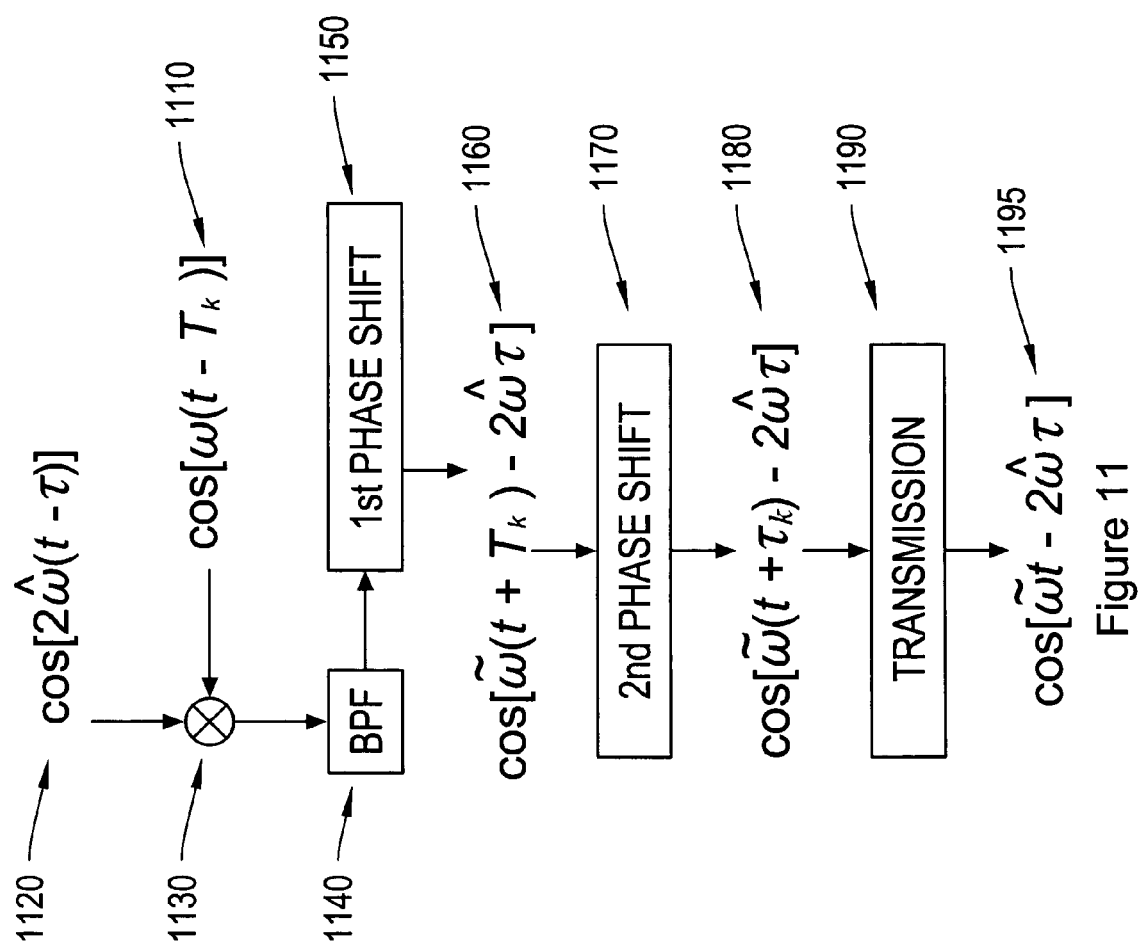
FIG. 11 is a flow diagram of a combining, filtering and phase-shifting process for beamforming according to an illustrative embodiment of the invention.

FIG. 11 is a flow diagram of a combining, filtering and phase-shifting process for beamforming according to an illustrative embodiment of the invention. For convenience of notation, we will refer to this node as Node k, where k can be any number 1, . . . , N. For purposes of illustration, the beacon signal received at Node k 1110 will be assumed to be a pure tone which can be represented as $$\cos(\omega(t-T_k))$$

where the frequency is $\omega$, and $T_k$ is the time delay associated with the transmission from the beacon location to the location of node k. Each node, including Node k has available a synchronized signal 1120. For purposes of illustration, this signal will be assumed to be a pure tone which can be represented as $$\cos(2\tilde{\omega}(t-\tau))$$

where the frequency is $2\tilde{\omega}$, and $\tau$ is a time delay. In one implementation, the frequency $\tilde{\omega}$ can be chosen as the average of the frequency of the beacon signal $\omega$ and the target frequency $\hat{\omega}$.

Next, Node k combines the synchronized signal and beacon signal as received by multiplying the two together using a modulator 1130, then applies a filter 1140 with a cutoff frequency chosen to retain the lower frequency components. In an illustrative embodiment, the filter eliminates all frequency components above a frequency of $2\tilde{\omega}-\omega$. The filtered signal can be represented by $$\cos(\tilde{\omega}(t-\tau)-\omega(\tau-T_k)).$$

Next, Node k introduces a phase shift. For illustrative purposes, this phase shift will be discussed in two stages, but as one of ordinary skill in the art will recognize, these stages can be performed in any manner that achieves the same final result. The first phase shift 1150 of $(\omega-\tilde{\omega})T_k$ achieves a signal 1160 that will coherently combine at the target frequency at the beacon location, and can be represented by $$\cos(\tilde{\omega}(t+T_k)-2\tilde{\omega}\tau).$$

The second phase shift 1170 of $\tilde{\omega}(T_k-\tau_k)$ "steers" the coherent beam to the target location and produces a signal 1180 that can be represented by $$\cos(\tilde{\omega}(t+\tau_k)-2\tilde{\omega}\tau)$$

where $\tau_k$ is the time delay associated with transmission from Node k to the target. Node k then transmits this signal 1190, which will appear at the target location after a time delay of $\tau_k$. The signal received at the target location 1195 can be represented as $$\cos(\hat{\omega}t-2\tilde{\omega}\tau).$$

In this manner, the signals transmitted by each of the nodes will combine coherently at the target location.

Beamforming in accordance with the invention provides a significant performance improvement over current technology in many important applications. One embodiment of the beamforming system of FIG. 9 provides an architecture for a communications system in which the coherent combination of a number of weak communication signals from a distributed set of communications relays is received as a much stronger signal at a satellite. In this embodiment, a signal broadcast at a downlink frequency from a satellite to a number of receiving nodes can be frequency-shifted to an uplink frequency, then modulated with data and transmitted. The modulated signals will combine coherently back at the satellite, enabling a bi-directional communications link. This embodiment replaces a single expensive, unwieldy high-gain antenna with an array of lower-power nodes. For example, in an embodiment with N nodes, the power required by any individual node drops as $1/N^2$, resulting in a significant cost savings, extended device lifetimes and system improvements in reliability and robustness. Performing this function with a traditional standard beamforming technique requires very precise knowledge of the node locations. However, beamforming methods in accordance with embodiments of the invention provide a significant advantage over such standard techniques by substantially relaxing the accuracy to which node locations must be known by using a beacon whose location and frequency is "near" that of the target. Further discussion of performance characteristics and requirements is given below. Additionally, if the satellite is itself the beacon and is moving, the beamforming system depicted in FIG. 9 may also steer the beam to the future location of the satellite when data transmission occurs. Thus, this embodiment also illustrates both the frequency-shifting and the beam-steering capabilities of the invention, as compared to traditional retrodirective techniques.

Other embodiments of the beamforming system of FIG. 9 are applicable to defense applications, in which it is desirable to be able to disrupt an enemy's communication system without physically destroying infrastructure. Traditional approaches to this problem include producing an omnidirectional "jamming" signal at an appropriate frequency. However, this approach impedes enemy and non-enemy communications indiscriminately. An illustrative embodiment of the beamforming system of FIG. 9 produces a coherent beam at a jamming frequency and location that disables the operation of a communications device at that location.

To illustrate the use of the beamforming embodiment of FIG. 11, consider the following exemplary embodiment of a jamming system as described above. Note that the details of this example are purely illustrative, and many such examples are in accordance with the invention. The GSM cellular telephone system uses radio frequency waves at roughly 900 MHz for uplink communications from a mobile device to the cellular tower, and radio frequency waves at roughly 925 MHz for downlink communications from the cell tower to the mobile device. An individual using a GSM cellphone may serve as a beacon, emitting radio frequency waves at roughly 900 MHz. These radio frequency waves are received at the nodes, which may be embedded in an array of UAVs, mounted in terrestrial vehicles or located in fixed positions on the ground. In addition to receiving the beacon signal, the nodes can obtain a synchronized signal at 1825 MHz by applying any of the embodiments of the synchronization method described herein. Applying the beamforming embodiment of FIG. 11, a signal can be transmitted by each of the nodes at the difference frequency 1825−900=925 MHz and targeted to the location of a second individual. Producing a coherent beam at this frequency at this location will disable downlink communications from the cellular tower to the second individual, without affecting other individuals receiving communications from this cell tower.

TABLES 1-2 present performance characteristics of the beamforming embodiment illustrated in FIG. 10, under the mathematical assumption that the number of nodes is large. The calculations presented thus far have assumed that all node positions are known exactly, allowing each node to precisely calculate the phase shifts required to achieve ideal coherent combination at the target position and target frequency. Any deviation from this ideal combination will result in a decrease from the ideal power of the target beam, with larger deviations resulting in more significant decreases in power. Such deviations may occur because of the inherent accuracy limitations of practical localization methods.

TABLE 1 presents the maximum allowable frequency shift between the target and beacon frequencies for several different node localization methods with corresponding node localization accuracies. The data in TABLE 1 assumes that no beam steering is performed, i.e. the beacon location is also the target location. These frequency shifts are the largest allowable when the expected power of the coherent beam at the target location is required to be greater than half the ideal power. TABLE 1 demonstrates that better node localization accuracy allows a broader range of target frequencies.

TABLE 1

| Localization Method | Accuracy | Maximum Frequency Shift |
|---|---|---|
| Civilian Global Positioning System (GPS) | 15 m | 2.65 MHz |
| GPS with Wide Area Augmentation System (WAAS) | 1.5 m | 26.5 MHz |
| Differential GPS (DGPS) with Carrier-Phase Enhancement (CPGPS) | 30 cm | 132.5 MHz |
| DGPS with Relative Kinematic Positioning (RKP) | 10 cm | 397.5 MHz |

TABLE 2 presents the maximum allowable beam steering angle between two paths, the paths linking a distant node array to the beacon location and to the target location, respectively (i.e., the beam steering angle is the angular deviation of the beam from a direct transmission toward the beacon location), under the same half-ideal-power requirement as TABLE 1. The data of TABLE 2 assumes that no frequency shifting is performed, i.e. the beacon frequency is the same as the target frequency. TABLE 2 demonstrates that the maximum allowable steering angle depends upon both the accuracy of the node localization method and the beacon frequency, with better node localization accuracy and lower beacon frequencies allowing larger steering angles.

TABLE 2

| | | Beacon Frequency | | | |
|---|---|---|---|---|---|
| Localization Method | Accuracy | 27 MHz | 915 MHz | 2.45 GHz | 5.8 GHz |
| GPS | 15 m | 5.62° | 0.17° | 0.062° | 0.026° |
| WAAS | 1.5 m | 56° | 1.7° | 0.62° | 0.2° |
| CPGPS | 30 cm | 180° | 8.3° | 3.1° | 1.3° |
| RKP | 10 cm | 180° | 25° | 9.3° | 3.9° |

The invention may be embodied in other specific forms without departing form the spirit or essential characteristics thereof. The foregoing embodiments are therefore to be considered in all respects illustrative, rather than limiting of the invention.

What is claimed is:

1. A method for achieving a coherent beam comprising:
providing a set of nodes including a plurality of nodes;
identifying, for each node in a subset of the set of nodes, the subset including at least two nodes, an associated previous node and an associated next node; and
obtaining a periodic signal which is synchronized among at least the nodes in the subset of nodes such that the periodic signal at each node in the subset of nodes has a common frequency and phase with the periodic signals at the other nodes in the subset of nodes by, at each node in the subset of nodes:
receiving a first signal transmitted by the associated previous node;
transmitting the first signal to the associated next node;
receiving a second signal transmitted by the associated next node;
transmitting the second signal to the associated previous node;
combining the first signal and the second signal;
filtering the combination of the first signal and the second signal to obtain the synchronized periodic signal;
frequency-shifting and phase-shifting, at each node in the subset of nodes, the synchronized periodic signal; and
transmitting the frequency- and phase-shifted signal, from each node in the subset of nodes, to achieve a coherent beam at a target location upon combination with the transmitted signals from each of the nodes.

2. The method of claim 1, wherein the second signal has a fundamental frequency that is the same as a fundamental frequency of the first signal, but with an arbitrary phase shift.

3. The method of claim 1, wherein transmitting the first signal to the associated next node comprises generating a periodic extension of the first signal and transmitting the second signal to the associated next node comprises generating a periodic extension of the second signal.

4. The method of claim 1, wherein combining the first signal and the second signal comprises multiplying the first signal and the second signal.

5. The method of claim 1, wherein filtering the product of the first signal and the second signal comprises applying one of a high-pass filter and a band-pass filter to remove low frequency components.

6. The method of claim 1, wherein the synchronized periodic signal has a fundamental frequency that is twice a fundamental frequency of the first signal.

7. The method of claim 1, wherein the steps of generating the synchronized periodic signal at each of the nodes are performed according to a pipelining protocol.

8. The method of claim 1, wherein each of the nodes is associated with a corresponding local oscillator with a fundamental frequency and wherein the associated plurality of local oscillators are independent of each other.

9. The method of claim 8, further comprising, at each of the nodes, estimating the frequency and phase shift of the first signal and the second signal using the corresponding local oscillator.

10. A method for transmitting a signal from a node comprising:
 initiating a transmission of a first periodic signal from a first node to a final node via a plurality of additional nodes according to a first order;
 receiving a second periodic signal originating from the final node via the plurality of additional nodes according to a second order reverse of the first order;
 combining the first periodic signal with the second periodic signal; and
 filtering the combined signal to obtain a periodic signal at the node which would be synchronized in frequency and phase with a signal obtained at any of the plurality of additional nodes formed by combining and filtering the first periodic signal with the second periodic signal as received by such additional node;
 frequency-shifting and phase-shifting the synchronized periodic signal; and
 transmitting the frequency- and phase-shifted signal from the node such that a coherent beam would be formed at a target location upon combination with frequency-shifted and phase-shifted synchronized periodic signals transmitted from at least one of the additional nodes.

11. The method of claim 10, wherein transmitting the first signal to the associated next node comprises generating a periodic extension of the first signal and transmitting the second signal to the associated next node comprises generating a periodic extension of the second signal.

12. The method of claim 10, wherein the synchronized periodic signal has a fundamental frequency that is twice a fundamental frequency of the first signal.

13. The method of claim 10, wherein each of the nodes is associated with a corresponding local oscillator with a fundamental frequency and wherein the associated plurality of local oscillators are independent of each other.

14. The method of claim 13, further comprising, at each of the nodes, estimating the frequency and phase shift of the first signal and the second signal using the corresponding local oscillator.

15. A method for beamforming comprising:
 obtaining, at each node of a plurality of nodes, a periodic signal that is synchronized across the plurality of nodes such that the periodic signal at each node has a common frequency and phase with the periodic signals at the other nodes in the plurality of nodes;
 receiving, at each of the at least one node, a beacon signal transmitted from a beacon location;
 combining, at each of the plurality of nodes, the received beacon signal and the synchronized periodic signal;
 filtering, at each of the plurality of nodes, the combination of the received beacon signal and the synchronized periodic signal;
 phase-shifting, at each of the plurality of nodes, the filtered combination of the received beacon signal and the synchronized periodic signal based on a target location, wherein the target location is different from the beacon location; and
 transmitting, at each of the plurality of nodes, the phase-shifted, filtered combined signal to achieve a coherent combination at the target location.

16. The method of claim 15, further comprising modulating the phase-shifted, filtered, combined signal with a data signal.

17. The method of claim 15, wherein the beacon signal is periodic with fundamental frequency in the range of 27 MHz to 5.8 GHz.

18. The method of claim 15, wherein the locations of each of the plurality of nodes is known to within an accuracy of 15 m.

19. The method of claim 15, wherein the target location is a location of a communications device.

20. The method of claim 15, further comprising phase-shifting, at each of the plurality of nodes, the phase-shifted, filtered combined signal based on a target frequency, wherein the target frequency is different from a fundamental frequency of the beacon signal.

21. The method of claim 20, wherein the target frequency is a jamming frequency.

22. The method of claim 20, wherein the target frequency is a radio frequency.

23. A system for transmitting a signal from a first node, the system comprising:
 a memory;
 a receiver;
 a transmitter;
 a processor configured to:
  retrieve, from memory, a first order of a plurality of additional nodes;
  initiate, with the transmitter, a transmission of a first periodic signal from the first node to a final node via a plurality of additional nodes according to the first order;
  receive, with the receiver, a second periodic signal originating from the final node via the plurality of additional nodes according to a second order reverse of the first order;
  combine the first periodic signal with the second periodic signal; and
  filter the combined signal to obtain a periodic signal at the node which would be synchronized in frequency and phase with a signal obtained at any of the plurality of additional nodes formed by combining and filtering the first periodic signal with the second periodic signal as received by such additional node;
 frequency-shift and phase-shift the synchronized periodic signal; and
 transmit the frequency- and phase-shifted signal from the node such that a coherent beam would be formed at a target location upon combination with frequency-shifted and phase-shifted synchronized periodic signals transmitted from at least one of the additional nodes.

24. The system of claim 23, wherein the first node is an unmanned vehicle.

25. The system of claim 23, wherein the first node is a relay in a distributed communication system.

26. A system for beamforming, the system comprising:
a plurality of nodes, each of which comprise:
- a memory;
- a receiver;
- a transmitter;
- a processor configured to:
  - obtain, at each node of a plurality of nodes, a periodic signal that is synchronized across the plurality of nodes such that the periodic signal at each node has a common frequency and phase with the periodic signals at the other nodes in the plurality of nodes;
  - receive, with the receiver, a beacon signal transmitted from a beacon location;
  - combine the received beacon signal and the synchronized periodic signal;
  - filter the combination of the received beacon signal and the synchronized periodic signal;
  - phase-shift the filtered combination of the received beacon signal and the synchronized periodic signal based on a target location, wherein the target location is different from the beacon location; and
  - transmit, with the transmitter, the phase-shifted, filtered combined signal to achieve a coherent combination at the target location.

27. The system of claim 26, wherein each of the plurality of nodes is an unmanned vehicle.

28. The system of claim 26, wherein each of the plurality of nodes is a relay in a distributed communication system.

29. A non-transitory computer readable medium storing computer executable instructions, which, when executed by a processor, cause the processor to carry out a method for transmitting a signal from a first node, comprising:
- retrieving with the processor, from a computer database, a first order of a plurality of additional nodes;
- initiating with the processor a transmission of a first periodic signal from the first node to a final node via a plurality of additional nodes according to the first order;
- receiving with the processor a second periodic signal originating from the final node via the plurality of additional nodes according to a second order reverse of the first order;
- combining with the processor the first periodic signal with the second periodic signal; and
- filtering with the processor the combined signal to obtain a periodic signal at the node which would be synchronized in frequency and phase with a signal obtained at any of the plurality of additional nodes formed by combining and filtering the first periodic signal with the second periodic signal as received by such additional node;
- frequency-shifting and phase-shifting the synchronized periodic signal; and
- transmitting the frequency- and phase-shifted signal from the node such that a coherent beam would be formed at a target location upon combination with frequency-shifted and phase-shifted synchronized periodic signals transmitted from at least one of the additional nodes.

30. The non-transitory computer readable medium of claim 29, wherein transmitting the first signal to the associated next node comprises generating a periodic extension of the first signal and transmitting the second signal to the associated next node comprises generating a periodic extension of the second signal.

31. The non-transitory computer readable medium of claim 29, wherein the synchronized periodic signal has a fundamental frequency that is twice the frequency of the first signal.

32. The non-transitory computer readable medium of claim 29, wherein each of the nodes is associated with a corresponding local oscillator with a fundamental frequency and wherein the associated plurality of local oscillators are independent of each other.

33. The non-transitory computer readable medium of claim 32, further comprising estimating the frequency and phase shift with the processor, for each of the nodes, of the first signal and the second signal using the corresponding local oscillator.

34. A non-transitory computer readable medium storing computer executable instructions, which, when executed by a processor, cause the processor to carry out a method for beamforming comprising:
- obtaining, with the processor, at each node of a plurality of nodes, a periodic signal that is synchronized across the plurality of nodes such that the periodic signal at each node has a common frequency and phase with the periodic signals at the other nodes in the plurality of nodes;
- receiving with the processor a beacon signal transmitted from a beacon location;
- combining with the processor the received beacon signal and the synchronized periodic signal;
- filtering with the processor the combination of the received beacon signal and the synchronized periodic signal;
- phase-shifting with the processor the filtered combination of the received beacon signal and the synchronized periodic signal based on a target location, wherein the target location is different from the beacon location; and
- transmitting with the processor the phase-shifted, filtered combined signal to achieve a coherent combination at the target location.

35. The non-transitory computer readable medium of claim 34, the method further comprising modulating with the processor the phase-shifted, filtered, combined signal with a data signal.

36. The non-transitory computer readable medium of claim 34, wherein the beacon signal is periodic with fundamental frequency in the range of 27 MHz to 5.8 GHz.

37. The non-transitory computer readable medium of claim 34, wherein the locations of each node are known to within an accuracy of 15 m.

38. The non-transitory computer readable medium of claim 34, wherein the target location is a location of a communications device.

39. The non-transitory computer readable medium of claim 34, the method further comprising phase-shifting with the processor the phase-shifted, filtered combined signal based on a target frequency, wherein the target frequency is different from a fundamental frequency of the beacon signal.

40. The non-transitory computer readable medium of claim 39, wherein the target frequency is a jamming frequency.

41. The non-transitory computer readable medium of claim 39, wherein the target frequency is a radio frequency.

* * * * *